US012632940B2

(12) United States Patent
Ko et al.

(10) Patent No.: US 12,632,940 B2
(45) Date of Patent: May 19, 2026

(54) SINGLE IMAGE DEBLURRING METHOD VIA HORIZONTAL AND VERTICAL DECOMPOSITION AND NETWORK SYSTEM THEREFOR

(71) Applicant: Korea University Research and Business Foundation, Seoul (KR)

(72) Inventors: Sung-Jea Ko, Seoul (KR); Sung Jin Cho, Seongnam-si (KR); Seo Won Ji, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 146 days.

(21) Appl. No.: 18/527,058

(22) Filed: Dec. 1, 2023

(65) Prior Publication Data

US 2024/0212110 A1 Jun. 27, 2024

(30) Foreign Application Priority Data

Dec. 2, 2022 (KR) ........................ 10-2022-0167044
Jan. 27, 2023 (KR) ........................ 10-2023-0011268

(51) Int. Cl.
*G06T 5/73* (2024.01)
*G06T 9/00* (2006.01)
*G06T 11/00* (2026.01)

(52) U.S. Cl.
CPC ................ *G06T 5/73* (2024.01); *G06T 9/002* (2013.01); *G06T 11/00* (2013.01); *G06T 2207/20081* (2013.01); *G06T 2207/20084* (2013.01)

(58) Field of Classification Search
CPC ........... G06T 11/00; G06T 2207/20081; G06T 2207/20084; G06T 5/60; G06T 5/73; G06T 9/002
See application file for complete search history.

(56) References Cited

U.S. PATENT DOCUMENTS 7,403,194 B2 7/2008 Gu
2019/0132514 A1* 5/2019 Ibi ........................ H04N 23/683
(Continued)

FOREIGN PATENT DOCUMENTS

KR 10-2006-0040920 A 5/2006
KR 10-2006-0091166 A 8/2006
(Continued)

OTHER PUBLICATIONS

[Supportive materials for Exception to Loss of Novelty] Seo-Won Ji et al., "XYDeblur: Divide and Conquer for Single Image Deblurring", CVPR 2022, Jun. 24, 2022, New Orleans, USA, pp. 17421-17430.

(Continued)

*Primary Examiner* — Ming Wu
(74) *Attorney, Agent, or Firm* — Hauptman Ham, LLP

(57) ABSTRACT

A single image deblurring method via vertical and horizontal decomposition includes receiving, by an input unit of a deblurring network system, a single image; extracting, by an encoder, features from the received single image; decoding, by a horizontal decoder, the features provided from the encoder using a first convolution kernel to generate a first residual image; decoding, by a vertical decoder, the features provided from the encoder using a second convolution kernel generated by rotating the first convolution kernel to generate a second residual image; and synthesizing, by a synthesis unit, the first residual image and the second residual image into the received single image to generate a deblurred image.

7 Claims, 8 Drawing Sheets
(5 of 8 Drawing Sheet(s) Filed in Color)

(56)                     References Cited

U.S. PATENT DOCUMENTS

| 2019/0188882 | A1* | 6/2019 | Son | G06F 3/048 |
|---|---|---|---|---|
| 2019/0205766 | A1* | 7/2019 | Krebs | G06T 7/33 |
| 2019/0297309 | A1* | 9/2019 | Chiu | H04N 9/312 |
| 2022/0385912 | A1* | 12/2022 | Koo | H04N 19/18 |

FOREIGN PATENT DOCUMENTS

| KR | 10-2009-0075207 | A | 7/2009 |
|---|---|---|---|
| KR | 10-2021-0028218 | A | 3/2021 |

OTHER PUBLICATIONS

Kiyeon Kim et al., "MSSNet: Multi-Scale-Stage Network for Single Image Deblurring", arXiv:2202.09652v3 [cs.CV], Apr. 5, 2022, pp. 1-29.

Office Action issued on Feb. 21, 2024, for corresponding Korean Patent Application No. 10-2023-0011268, along 1 with an English machine translation (10 pages).

Notice of Allowance issued on Apr. 24, 2024, for corresponding Korean Patent Application No. 10-2023-0011268 (3 pages).

Jiawei Zhang et al., "Learning Fully Convolutional Networks for Iterative Non-blind Deconvolution", Proceedings of the IEEE Conference on Computer Vision and Pattern Recognition (CVPR), Jul. 21-26, 2017, pp. 3817-3825.

* cited by examiner

Blurry image

Sharp image

Encoders                    Decoders

FIG. 7

| Method | Variations | GoPro | | RealBlur | | Complexity[†] | | |
|---|---|---|---|---|---|---|---|---|
| | | PSNR | SSIM | PSNR | SSIM | Params | GMACs | VRAM |
| PSS-NSC | Baseline* | 30.94(30.92) | 0.9494 | 28.78 | 0.8716 | 6.98 | 1167.24 | 3.79 |
| | Channel[†] | 31.06 | 0.9509 | 28.63 | 0.8667 | 17.89 | 3020.81 | 5.97 |
| | Layer[†] | 31.18 | 0.9524 | 28.78 | 0.8721 | 10.08 | 1703.95 | 5.55 |
| | Ours | 31.27 | 0.9531 | 28.88 | 0.8765 | 6.98 | 1784.39 | 5.68 |
| DMPHN | Baseline* | 30.28(30.25) | 0.9408 | 26.97 | 0.8170 | 7.23 | 1100.18 | 1.62 |
| | Channel[†] | 30.23 | 0.9414 | 26.86 | 0.8201 | 18.63 | 3060.28 | 2.52 |
| | Layer[†] | 30.48 | 0.9443 | 27.78 | 0.8366 | 10.33 | 1509.11 | 2.30 |
| | Ours | 30.63 | 0.9458 | 28.02 | 0.8459 | 7.23 | 1754.07 | 2.41 |
| MSCNN | Baseline* | 29.22(29.08) | 0.9273 | 27.91 | 0.8442 | 11.72 | 4728.69 | 3.21 |
| | Channel[†] | 29.34 | 0.9292 | 27.92 | 0.8432 | 28.94 | 11673.07 | 4.84 |
| | Layer[†] | 28.97 | 0.9250 | 27.92 | 0.8449 | 17.25 | 6960.32 | 4.71 |
| | Ours | 29.98 | 0.9382 | 28.19 | 0.8580 | 11.72 | 6966.13 | 4.78 |

SINGLE IMAGE DEBLURRING METHOD VIA HORIZONTAL AND VERTICAL DECOMPOSITION AND NETWORK SYSTEM THEREFOR

CROSS-REFERENCE TO RELATED APPLICATION

The present application claims the benefit of priority to Korean Patent Application No. 10-2022-0167044, filed on Dec. 2, 2022 and Korean Patent Application No. 10-2023-0011268, filed on Jan. 27, 2023 in the Korean Intellectual Property Office. All of the aforementioned applications are hereby incorporated by reference in their entireties.

BACKGROUND

Technical Field

The present disclosure relates to a single image deblurring method via vertical and horizontal decomposition and a network system therefor, and more particularly, to a single image deblurring method via vertical and horizontal decomposition using an image restoration algorithm based on a deep learning algorithm and a network system therefor.

Related Art

In general, when acquiring an image, a blur may occur on the image for various reasons. FIG. 1 shows an example of deblurring, which restores a deteriorated image to a clear image. Image deblurring, which is a technology that removes a blur from an image, aims to remove, when a blurry image such as an upper image in FIG. 1 is received as an input, a blur from the image so as to create a sharp image such as a lower image. A blur in an image occurs for various reasons, such as hand tremor, object movement, and out-of-focus. Deblurring of an image is considered as a very difficult task because a degree of blur may vary depending on a location in the image. The technology of removing a blur from an image is used as preprocessing in various technologies, and is not only very important aesthetically, but also plays a very important role in a vision system as a whole. For example, as image deterioration due to blurring reduces the quality of an image itself, which is not only aesthetically unpleasing, but also can reduce the performance of a computer vision algorithm such as object recognition in a blurry image, it is very important to solve the problem.

FIG. 2 is a diagram showing an example of a U-shape network.

In general, the U-shape network (U-Net) as shown in FIG. 2 is used as a deblurring network to remove a blur on an image. A U-Net generally has an architecture that receives an image as the input, compresses information through reducing a resolution of a feature map with encoders, several and then restores the information in a decoder. The U-Net extracts a feature map from an input image, and has an architecture that gradually reduces and then increases the resolution of the feature map. In general, in the U-Net, a portion that reduces the feature map is called an encoder, and a portion that increases the feature map is called a decoder. Most of the networks consists entirely of one encoder and one decoder.

In general, a motion blur may include a complex blur such as object movement and camera shake in an image, but a general architecture such as that shown in FIG. 2 may have many difficulties in effectively handling the blur that is present in the image. In particular, it is difficult to solve the complex blur described above with a single decoder.

SUMMARY

A technical task to be achieved by the present disclosure is to provide a single image deblurring method via vertical and horizontal decomposition that uses features more effectively by rotating and reusing a convolution kernel of a decoder in another decoder, and a network system therefor.

Technical problems to be solved in the present disclosure may not be limited to the above-described problems and other technical problems, which are not mentioned herein, will definitely be understood by those skilled in the art from the following description.

In order to achieve the foregoing technical task, there is provided a single image deblurring method via vertical and horizontal decomposition, the method including: receiving, by an input unit of a deblurring network system, a single image; extracting, by an encoder, features from the received single image; decoding, by a horizontal decoder, the features provided from the encoder using a first convolution kernel to generate a first residual image; decoding, by a vertical decoder, the features provided from the encoder using a second convolution kernel generated by rotating the first convolution kernel to generate a second residual image; and synthesizing, by a synthesis unit, the first residual image and the second residual image into the received single image to generate a deblurred image.

According to an embodiment of the present disclosure, in the generating of the second residual image, the second convolution kernel may be formed by rotating the first convolution kernel in a counterclockwise direction so as to allow a deep learning parameter used by the horizontal decoder when generating the first residual image to be shared with the vertical decoder.

According to an embodiment of the present disclosure, a first U-shape network may be generated by the input unit, the encoder, and the horizontal decoder to train first parameters through deep learning for generating the first residual image, and a second U-shape network may be generated by the input unit, the encoder, and the vertical decoder to share the first parameters so as to generate the second residual image.

According to an embodiment of the present disclosure, without external supervision, the horizontal decoder may be trained to remove a transverse blur so as to output the first residual image, and the vertical decoder may be trained to remove a longitudinal blur so as to output the second residual image.

According to an embodiment of the present disclosure, the first residual image and the second residual image may be blurs estimated by the horizontal decoder and the vertical decoder, respectively, and horizontal and vertical motion components may be included in the first residual image and the second residual image to decompose information inherent in the encoded features into information along an x-axis and a y-axis.

In order to achieve the foregoing technical task, there is provided a single image deblurring network system via vertical and horizontal decomposition, the system including: an input unit that receives a single image; an encoder that extracts features from the received single image; a horizontal decoder that decodes the features provided from the encoder using a first convolution kernel to generate a first residual image; a vertical decoder that decodes the features provided from the encoder using a second convolution kernel generated by rotating the first convolution kernel to generate a second residual image; and a synthesis unit that synthesizes the first residual image and the second residual image into the received single image to generate a deblurred image.

According to an embodiment of the present disclosure, the vertical decoder may use the second convolution kernel formed by rotating the first convolution kernel in a counterclockwise direction to generate the second residual image, and share a deep learning parameter used by the horizontal decoder when generating the first residual image with the horizontal decoder.

According to an embodiment of the present disclosure, there may be provided a single image deblurring method via vertical and horizontal decomposition that uses features more effectively by rotating and reusing a convolution kernel of one decoder in another decoder, and a network system therefor.

According to an embodiment of the present disclosure, a single image deblurring method via vertical and horizontal decomposition, and a network system therefor may be applicable to various networks such as a U-Net, so as to improve the deblurring performance of the network.

It is to be understood that the effects of the present disclosure are not limited to the foregoing effects, and include all effects that may be deduced from the features described in the detailed description or claims of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 shows a table in which results of deblurring in the GoPro dataset and the RealBlur dataset are compared with each other.

DESCRIPTION OF SYMBOLS

Figure 1:
FIG. 1 shows an example of deblurring, which restores a deteriorated image to a clear image.
Figure 1:
Figure 1:
Figure 2:
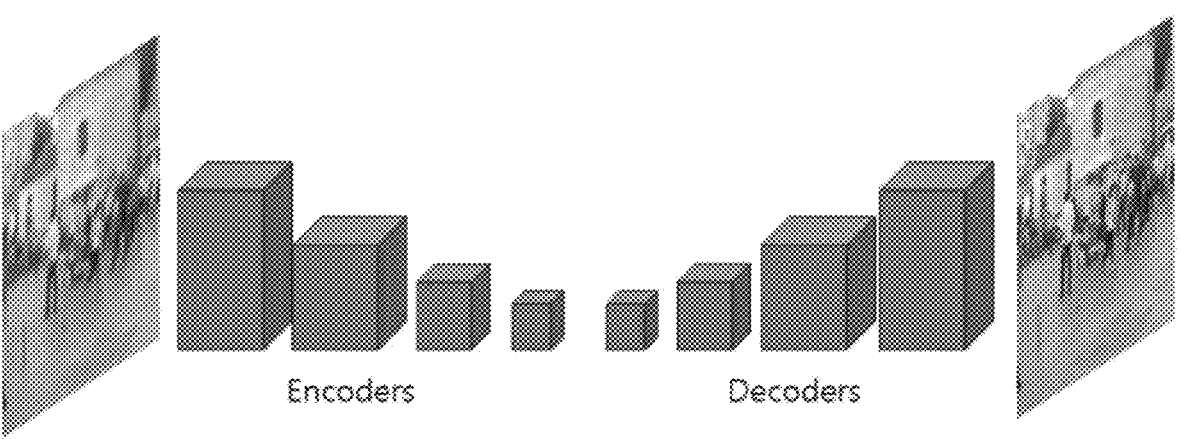
FIG. 2 is a diagram showing an example of a U-shape network.

10: Input unit
20: Encoder
30: Horizontal decoder
40: Vertical decoder
50: Synthesis unit

DETAILED DESCRIPTION

As various modifications can be made and diverse embodiments are applicable to the present disclosure, specific embodiments will be illustrated with reference to the accompanying drawings and described in detail through the following description. However, those specific embodiments should not be construed to limit the present disclosure, and should be construed as being extended to all modifications, equivalents, and substitutes included in the concept and technical scope of the present disclosure. Like reference numerals refer to like elements in describing each drawing.

Unless defined otherwise, the terms used herein including technological or scientific terms have the same meaning that is generally understood by those skilled in the art to which the present disclosure pertains. The terms used herein shall not be interpreted not only based on the definition of any dictionary but also the meaning that is used phase in the field to which the invention pertains, and shall not be interpreted too ideally or formally unless clearly defined herein.

Hereinafter, embodiments of the present disclosure will be described in more detail with reference to the accompanying drawings.

Many convolutional neural networks (CNNs) for single image deblurring estimate a potential clear image using a U-Net architecture. A single lane of an encoder-decoder architecture, which has long been proven to be effective in image restoration tasks, overlooks the characteristics of deblurring that produces a blurry image from a complex blur kernel due to an entangled operation. For an effective network architecture for single image deblurring, an embodiment of the present disclosure proposes a removing a blur through complementary sub-solution method of learning with a single encoder-2-decoder architecture. The present disclosure successfully learns a method of decomposing encoded feature information by several decoders into directional elements, and shares a kernel generated by rotating a convolution kernel used in any one decoder with another decoder, thereby preventing the decoder from separating unnecessary elements such as color shift as well as further improving network efficiency and deblurring performance. A single image deblurring method via vertical and horizontal decomposition according to the embodiment of the present disclosure, and a deblurring network system therefor may exhibit superior results compared to a U-Net while maintaining network parameters, thereby improving the performance of an existing deblurring network when employed and used as a base network for another network.

The single image deblurring method via vertical and horizontal decomposition according to an embodiment of the present disclosure splits a large problem of deblurring into several sub-problems and uses a multiple decoder architecture to solve the sub-problems. Because a result of each decoder is ultimately synthesized with an input image, the deblurring network system learns a blur or residual. Embodiments of the present disclosure are based on the discovery of features in which each decoder is trained to remove transverse and longitudinal blurs without external supervision in a process of experimentally training an encoder-decoder network.

Figure 3:
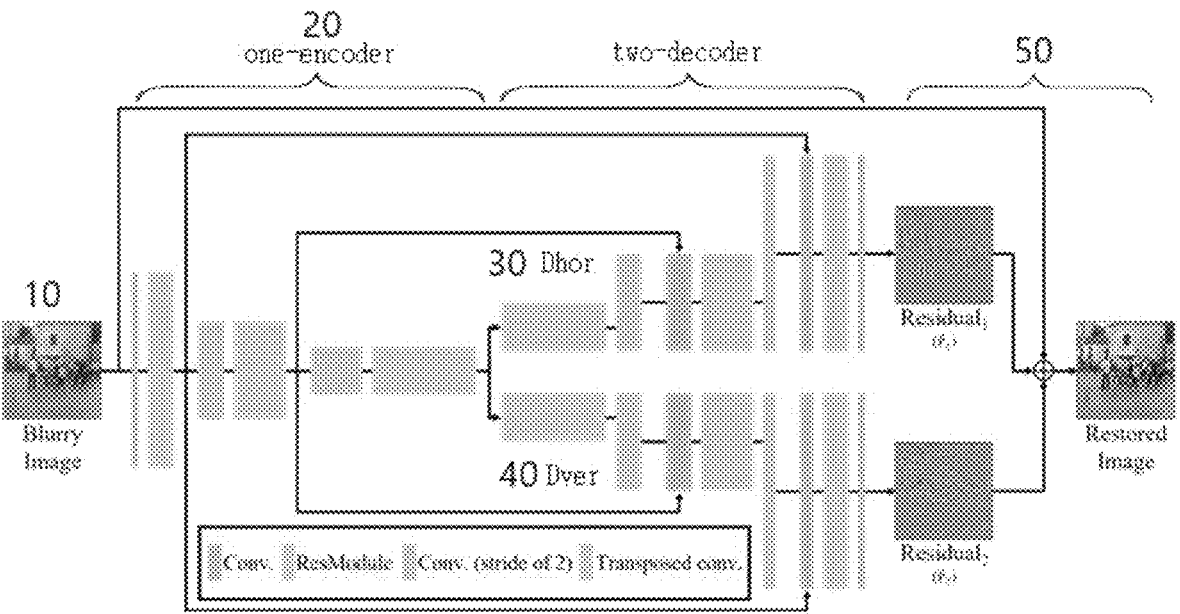
FIG. 3 shows an example of a deblurring network system that implements a single image deblurring method via vertical and horizontal decomposition according to an embodiment of the present disclosure.

FIG. 3 shows an example of a deblurring network system that implements a single image deblurring method via vertical and horizontal decomposition according to an embodiment of the present disclosure.

Referring to FIG. 3, the deblurring network system of this embodiment includes an input unit 10, an encoder 20, a horizontal decoder 30, a vertical decoder 40, and a synthesis unit 50.

The input unit 10 receives a single image. The encoder 20 encodes the received single image to extract a feature. Here, the encoded image features z may be obtained as shown in Equation (1) below.

$$z = \varepsilon(x; \Theta_e) \tag{1}$$

Here, ε represents an encoder whose parameter is de.

In general, the encoder architecture extracts information through sequentially arranged channels while reducing the resolution of a single image received through the input unit 10. Then, when a height of a certain channel is reduced by half compared to a previous channel, the width and height may be respectively reduced by half to reduce the information by 4 times. Then, in order to preserve the information, the number of the channels is usually doubled. That is, on the encoder side, as the stage progresses, the number of channels increases.

The horizontal decoder 30 decodes features provided from the encoder 20 using a first convolution kernel to generate a first residual image. The vertical decoder 40 decodes features provided from the encoder 20 using a second convolution kernel generated by rotating the first convolution kernel to generate a second residual image.

In general, afterimage removal networks are being developed based on a U-shape network (U-Net). The U-Net extracts a feature map from an input image, and has an architecture that gradually reduces and then increases the resolution of the feature map. In the U-Net, a portion that reduces the feature map is called an encoder, and a portion that increases the feature map is called a decoder. Most of the network consists entirely of one encoder and one decoder. On the contrary, the deblurring network system of this embodiment shown in FIG. 3 is a one-encoder-two-decoder network system including one encoder 20 and two decoders 30, 40. In FIG. 3, the encoder and decoders are expressed as an array of boxes. A vertical length, or height, of boxes in the encoder and two decoders represents a resolution. A transverse width of each box corresponds to a channel in a deep learning network.

Using such a one-encoder-two-decoder network, a network may be designed to estimate a blur r=y−x in a blurry image (an input single image), where x represents the blurry image and y represents a sharp image corresponding to the blurry image. Blur estimation r̂ may be obtained through a network $\mathcal{F}$ illustrated in FIG. 3 using a learnable parameter θ expressed as shown in Equation (2).

$$\hat{r} = \mathcal{F}(x; \Theta) \tag{2}$$

In this embodiment, blur estimation may be obtained using two separate decoder networks, a horizontal decoder (Dhor) 30 and a vertical decoder (Dver) 40, as shown in Equation (3) below.

$$\hat{r} = \mathcal{D}_{hor}(z; \Theta_{hor}) + \mathcal{D}_{ver}(z; \Theta_{ver}) \tag{3}$$

Here, Θhor and Θver are network parameters of Dhor and Dver, respectively, and z represents an encoded image feature. Two decoders Dhor 30 and Dver 40 may have the same architecture. When only an encoder and either one of the two decoders are used, the network architecture is reduced to a common U-Net architecture.

Referring to a first residual image $r_1$ and a second residual image r2 in FIG. 3, the input unit 10, the encoder 20, and the horizontal decoder 30, which constitute a first U-shape network, may learn first parameters through deep learning for generating the first residual image. Additionally, the input unit 10, the encoder 20, and the vertical decoder 40, which constitute a second U-shape network, may share the first parameters to perform learning for generating the second residual image. The first and second residual images in FIG. 3 show examples of blurs estimated from two decoders, Dhor 20 and Dver 40. In the deblurring network system of this embodiment, the two blurs obtained by using two separate decoders include horizontal and vertical motion components. That is, a first blur output by the horizontal decoder includes a horizontal motion component, and a second blur output by the vertical decoder includes a vertical motion component. The properties of the first and second residual images denote that the residual image removal network system allows a network to decompose information inherent in the encoded features into information along an x-axis (horizontal axis) and y-axis (vertical axis) without applying explicit constraints thereto. This can be an observational basis for using a method of sharing decoder parameters for more efficient deblurring. Since the two decoders in this embodiment can learn unique information along axes orthogonal to each other, the network parameters of the two decoders may be shared as shown in Equation (4) below.

$$\hat{r} = \mathcal{D}_{hor}(z; \Theta_d) + \mathcal{D}_{ver}(z; \Theta_{rd}) \tag{4}$$

Here, Θrd is a parameter obtained by rotating a network parameter of Θd by 90 degrees in a counterclockwise direction. The Dhor may be selected as a default decoder, but this is not limited thereto. On average, a resultant blur from the Dhor has signal power higher than that of the Dver, which denotes that there occurs a greater change along the horizontal axis compared to the vertical axis. This is a natural phenomenon because a camera can rotate 360 degrees around its yaw axis, but its pitch rotation while taking a picture is somewhat limited. The horizontal decoder is not always the default decoder, and it may also be possible to set the default decoder in a direction in which the signal power is the highest as a result of blur or residual learning from a blurry image as a default direction and set a supplementary decoder in a direction perpendicular thereto. For example, in the case of an image of a falling object or when a camera moves up and down, higher signal power may be output in a vertical direction.

The synthesis unit 50 synthesizes the first and second residual images into an input single image (Blurry Image) to generate a deblurred image (Restored Image).

Figure 4:
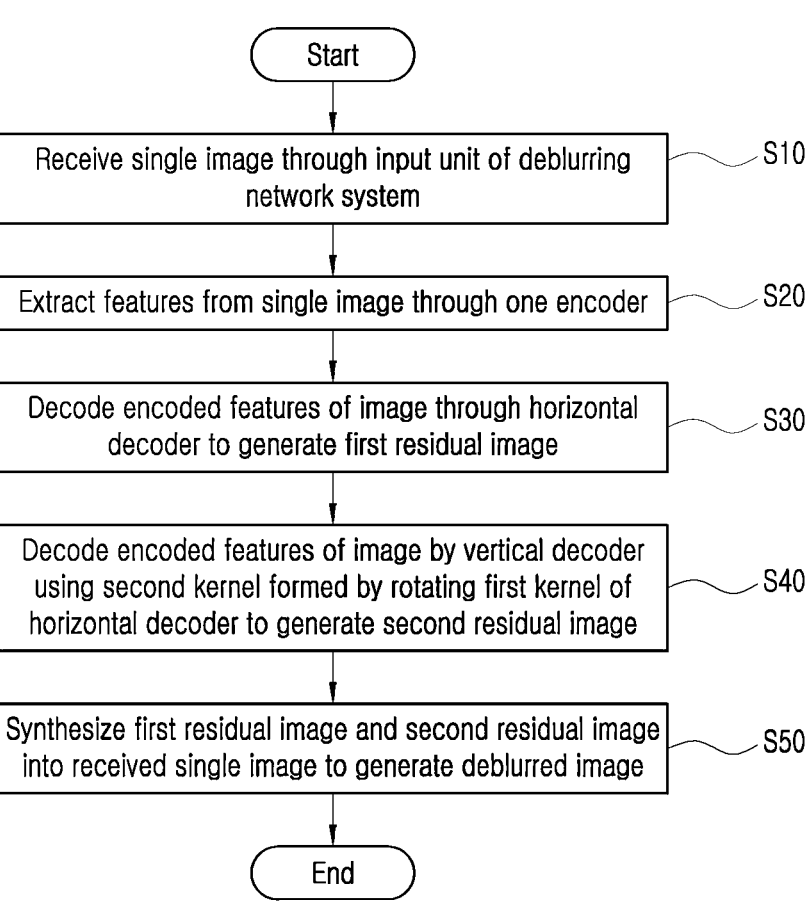
FIG. 4 is a flowchart showing a single image deblurring method via vertical and horizontal decomposition according to an embodiment of the present disclosure.

FIG. 4 is a flowchart showing a single image deblurring method via vertical and horizontal decomposition according to an embodiment of the present disclosure.

Referring to FIG. 4, in a single image deblurring method via vertical and horizontal decomposition, first, the input unit 10 of the deblurring network system receives a single image at step S10. The encoder 20 extracts features from the received single image at step S20. The horizontal decoder 30 decodes the features provided from the encoder 20 using a first convolution kernel to generate a first residual image at step S30. The vertical decoder 40 decodes the features provided from the encoder 20 using a second convolution kernel generated by rotating the first convolution residual image at step S40. The kernel to generate a second synthesis unit 50 synthesizes the first residual image residual₁ and the second residual image residual₂ into the received single image to generate a deblurred image at step S50.

Hereinafter, it will be described in more detail.

In the single image deblurring method via vertical and horizontal decomposition of this embodiment, unlike a typical network, image features provided from an encoder are decoded through a horizontal decoder to generate a first residual image at step S30, and the image features provided from the encoder are decoded through a vertical decoder using a second convolution kernel generated by rotating a first convolution kernel used by the horizontal decoder to generate the first residual image by 90 degrees in a counterclockwise direction so as to generate a second afterimage image at step S40. As such, in this embodiment, one type of decoder may be partitioned into two decoders, that is, a horizontal decoder and a vertical decoder, the horizontal decoder may be trained to remove a horizontal blur, and the vertical decoder may be trained to remove a vertical blur. In this embodiment, instead of learning only with the encoder and decoder of the deblurring network system, a residual image itself may be provided for learning.

For example, a horizontal decoder may implicitly generate a default blur, e.g., a first residual image in a given 2D scene, and a vertical decoder may generate a complementary blur, e.g., a second residual image of a separate decoder. The method of this embodiment is a method of performing decomposition on deblurring in an X-axis direction (horizontal direction) and a Y-axis direction (vertical direction) based on an observation, without explicit supervision, that the default and supplementary blurs include blurred edges along the longitudinal (horizontal) and transverse (vertical) axes of an image plane, respectively. Based on the observation, a 1-encoder-2-decoder architecture may be further improved by spatially rotating the first convolution kernel in the horizontal decoder and sharing parameters with the vertical decoder. Additionally, the method of this embodiment that is performed in a different manner from an existing parameter sharing approach in a CNN, which sacrifices performance for network efficiency, may provide a separate decoder architecture that shares or recycles kernels and parameters by rotation, thereby reducing the number of parameters, but also eliminating undesirable separation of features that are not relevant to a deblurring task so as to improve performance.

Subsequent to operating the horizontal decoder 30 and the vertical decoder 40, the synthesis unit 50 synthesizes first and second residual images into an input single image to generate a deblurred image at step S50. That is, the synthesis unit 50 may train a restoration network by adding an input image to the residual images, e.g., first and second residual images, output from the two decoders. That is, the residual image is in a sense, a minus block component, and the encoder-decoder network may be trained to generate such a minus block component.

As a main feature, the single image deblurring method via vertical and horizontal decomposition according to an embodiment of the present disclosure does not learn only a minus residual, but also splits the residual into a transverse component and a longitudinal component to be partitioned into two so as to remove blurs corresponding thereto, respectively. Specifically, as described above, the convolution kernel of one network is reused. Here, in this embodiment, since the horizontal decoder and vertical decoder remove blurs horizontally (transversely) and vertically (longitudinally), as a method of recycling a convolution kernel, a second convolution kernel generated by rotating a first convolution kernel of the horizontal decoder in a counterclockwise direction may be used by the vertical decoder to generate a second residual image.

As in this embodiment, when the decoder is partitioned into two, a horizontal decoder and a vertical decoder, and a technique for removing blurs in vertical and horizontal directions is applied, it can be seen that there is no significant change in the amount of calculation in terms of parameters. This is because basically, when the decoder is partitioned into two, the number of parameters tends to increase since the number of weights in a convolution kernel typically increases in deep learning, but in the method of this embodiment, a second convolution kernel of the vertical decoder is generated by counterclockwise rotation of a first convolution kernel of the horizontal decoder as described above, and the parameters or weights (weighted values) in the horizontal learning are also used (shared) in the vertical learning. That is, the convolution kernel is reused or shared, thereby obtaining the same effect as if there is no increase in the number of parameters.

Unlike this embodiment, in the case of having two decoders and not using the kernel sharing described above, or in a single decoder architecture, the decoder itself must learn the residual at once using the features previously generated and extracted from the encoder. In this embodiment, the residual is partitioned into a transverse direction (horizontal direction) and a longitudinal direction (vertical direction) to solve problems, respectively, thereby ultimately achieving the effect of solving a big problem of blur removal.

The single image deblurring g method via vertical and horizontal decomposition in this embodiment as described above and the network system therefor were applied to an existing deblurring network for testing. Among existing U-shape networks that remove a blur, the method and system is applied for testing to three representative types, Presented parameter Selective Sharing and Nested Skip Connections (PSS-NSC), Deep Multi-Patch Hierarchical Network (DMPHN), and multiscale CNNs (MSCNN).

Figure 5:
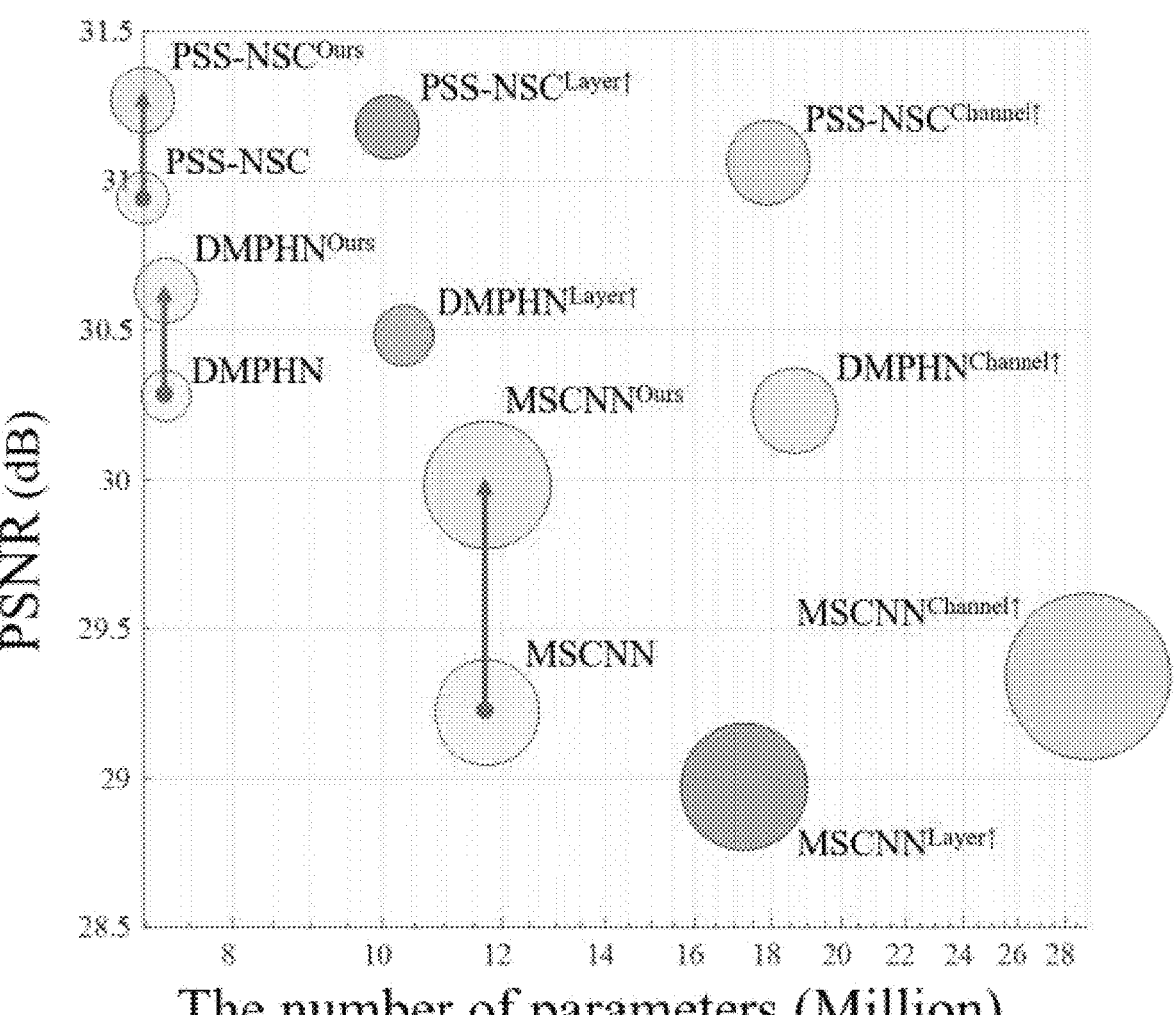
FIG. 5 shows a result of deblurring in a GoPro dataset.
Figure 6:
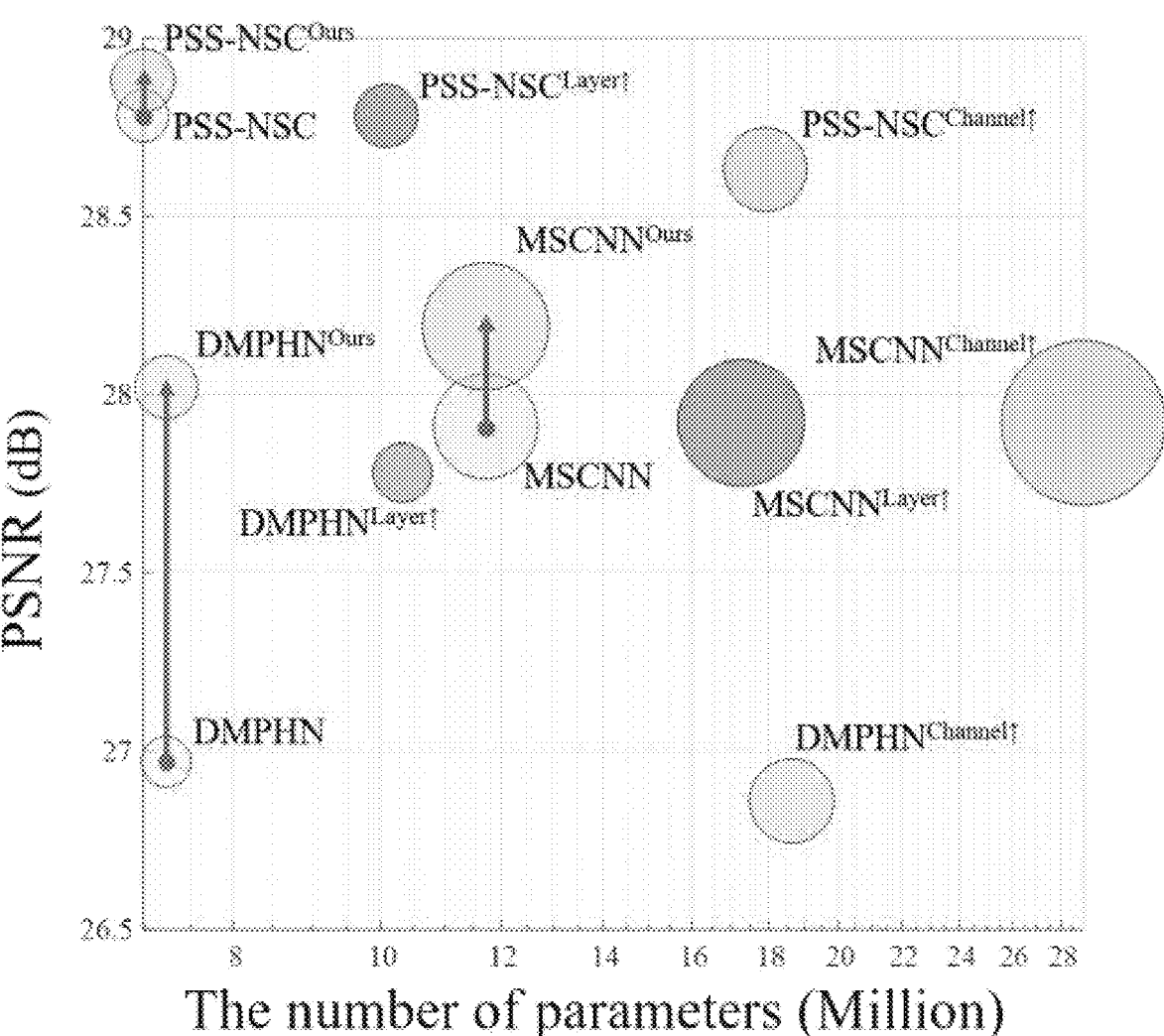
FIG. 6 shows a result of deblurring in a RealBlur dataset.

FIG. 5 shows a result of deblurring in a GoPro dataset. FIG. 6 shows a result of deblurring in a RealBlur dataset.

In FIGS. 5 and 6, a transverse axis represents the number of parameters used in training a deblurring network system, and a longitudinal axis represents a peak signal-to-noise ratio (PSNR). As the PSNR increases, it exhibits similar characteristics to the original. A radius of a circle in each graph represents a Giga Multiply-Add Operations per Second (GMAC). When the single image deblurring method via vertical and horizontal decomposition of this embodiment is applied (referred to as PSS-NSC$^{Ours}$, DMPHN$^{Ours}$, MSCN-N$^{Ours}$), as mentioned above, the performance is effectively improved without increasing the number of parameters because the parameters are reused. In addition, the performance improvement compared to GMAC, which refers to the amount of calculation, is also very high. When using two decoders, i.e., the horizontal decoder and the vertical decoder, of course, vertical features and horizontal features may be extracted respectively. However, as described above, the method of this embodiment uses the horizontal decoder and the vertical decoder to share weights by rotating the convolution kernel. Therefore, there is no increase at all in terms of parameters. However, since the deblurring problem is solved with two decoders instead of one, it can be seen that the amount of calculation, which is called GMAC, expressed as a diameter of a circle in FIGS. 5 and 6, increases very slightly. The PSNR is an indicator of how close to the original image has been restored. In the case of the method according to the embodiment of the present disclosure, it can be seen that the amount of calculation increases very slightly, but the PSNR increases significantly. That is, the vertical decoder rotates a convolution kernel of the horizontal decoder to use the rotated convolution kernel as its own convolution kernel, and therefore, there is no increase in the number of parameters through parameter sharing, and it can be seen that the amount of calculation is slightly increased because the decoder is partitioned horizontally and vertically, but performance is greatly improved when compared thereto.

FIG. 7 shows a table in which results of deblurring in the GoPro dataset and the RealBlur dataset are compared with each other.

Referring to FIG. 7, experimental result data of the method of this embodiment are presented, including an increase in the number of channels and the number of layers for a fair experiment. The number of parameters (Params) is measured in units of millions. The GMAC is estimated to have an input resolution of 720P (1280×720). The Video Radom-Access Memory (VRAM) usage is measured in units of Gigabytes (GBs) and an input size thereof is 256×256. The PSNR and structural similarity index measure (SSIM) values increased compared to a baseline method (Baseline) are displayed in red and blue, respectively. As shown in the table, it can be seen that the method of this embodiment, that is, an algorithm of partitioning the decoder horizontally and vertically, and sharing the kernel and parameters, has the best performance.

Figure 8:
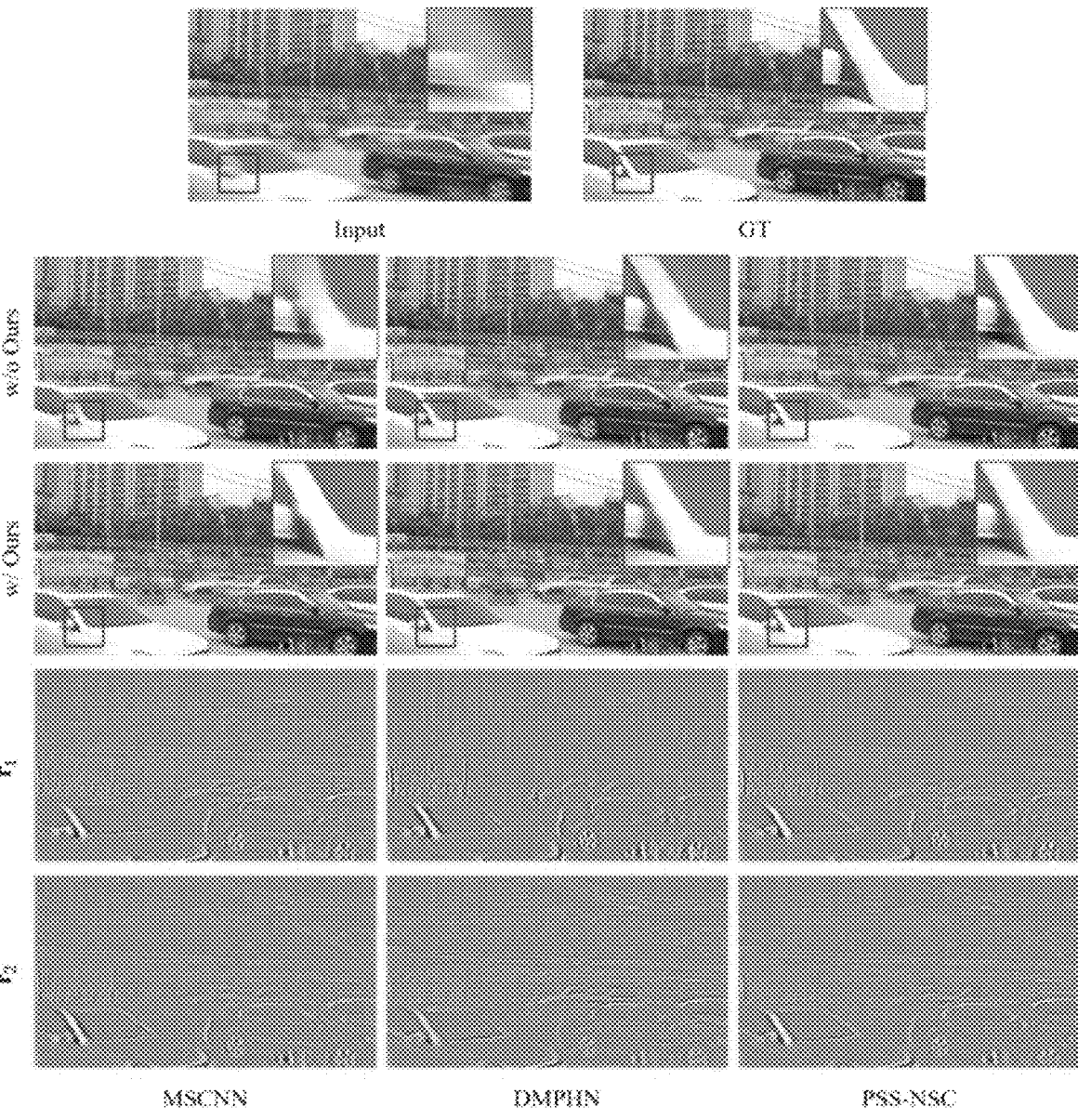
FIGS. 8 and 9 show resultant images from the GoPro dataset.
Figure 9:
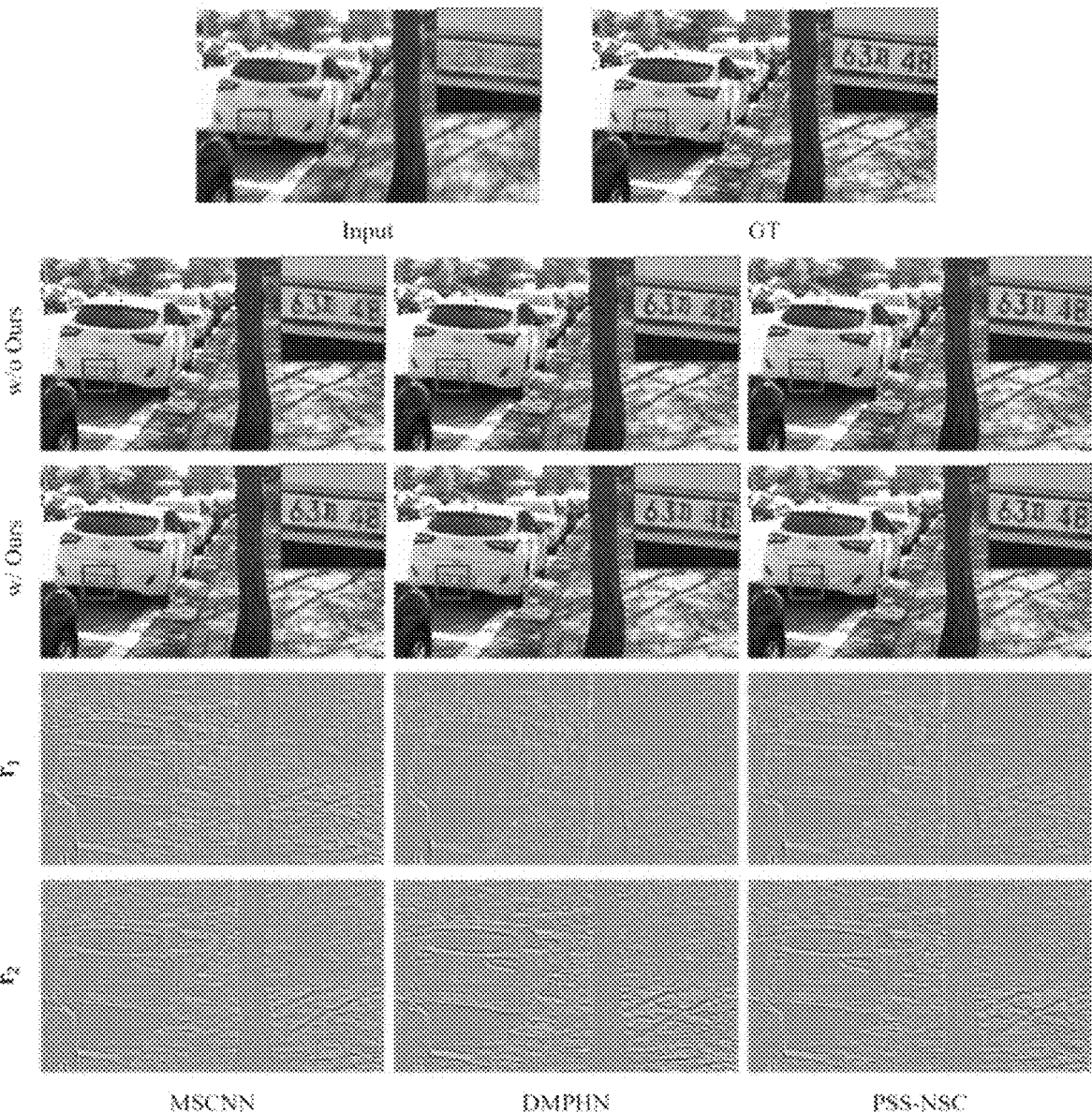

FIGS. 8 and 9 show resultant images from the GoPro dataset.

FIGS. 8 and 9 show experimental results for MSCNN, DMPHN, and PSS-NSC when the method of this embodiment is applied to a GOPRO data set (w/ours) and when it is not applied (w/o ours). A red box portion in FIGS. 8 and 9 is an enlarged area. Comparing the upper and lower rows when the method of this embodiment is applied and when it is not applied to the various networks above, it can be seen that much better performance is achieved when the method of this embodiment is applied. R1 and r2 refer to residual components of vertical and horizontal features, respectively.

According to an embodiment of the present disclosure, a convolution kernel rotated from one decoder to the other decoder is shared, thereby significantly improving deblurring performance while using the same number of parameters as a standard U-Net architecture.

Unlike the embodiment of the present disclosure, when each decoder is trained to remove a blur with an architecture having independent parameters, an overall color of the image may change during a process of solving problems. In the present disclosure, a kernel generated by rotating the kernel of one decoder is used by the other decoder, thereby eliminating this problem through reusing the parameters of the decoder as well as reducing an increase in the number of overall parameters in a network.

Removing blurs from images is a very classic, but considered to be a very core technology for image acquisition. Basically, it may be mounted on an Image Signal Processor (ISP) of a smartphone or camera, thereby greatly improving the quality of the acquired images. Therefore, embodiments of the present disclosure are basically applicable to all fields that utilize cameras.

The foregoing description of the present disclosure is for illustrative purposes, but it will be apparent to those skilled in the art to which the invention pertains that the invention can be easily modified in other specific forms without departing from the technical concept and essential characteristics thereof. Therefore, it should be understood that embodiments described above are merely illustrative but not restrictive in all aspects. For example, each element described as a single entity may be distributed and implemented, and likewise, elements described as being distributed may also be implemented in a combined manner.

The scope of the present disclosure is defined by the appended claims, and all changes or modifications derived from the meaning and range of the claims and equivalents thereof should be construed to be embraced by the scope of the present disclosure.

What is claimed is:

1. A single image deblurring method via vertical and horizontal decomposition, the method comprising:
   receiving, by an input unit of a deblurring network system, a single image;
   extracting, by an encoder, features from the received single image;
   decoding, by a horizontal decoder, the features provided from the encoder using a first convolution kernel to generate a first residual image;
   decoding, by a vertical decoder, the features provided from the encoder using a second convolution kernel generated by rotating the first convolution kernel to generate a second residual image; and
   synthesizing, by a synthesis unit, the first residual image and the second residual image into the received single image to generate a deblurred image,
   wherein the extracting the features includes:
   extracting a feature map from the received single image through a convolutional operation; and
   reducing resolution of the feature map to generate the features.

2. The method of claim 1, wherein in the generating of the second residual image, the second convolution kernel is formed by rotating the first convolution kernel in a counterclockwise direction so as to allow a deep learning parameter used by the horizontal decoder when generating the first residual image to be shared with the vertical decoder.

3. The method of claim 2, wherein a first U-shape network is generated by the input unit, the encoder, and the horizontal decoder to train first parameters through deep learning for generating the first residual image, and
   wherein a second U-shape network is generated by the input unit, the encoder, and the vertical decoder to share the first parameters so as to generate the second residual image.

4. The method of claim 3, wherein without external supervision, the horizontal decoder is trained to remove a transverse blur so as to output the first residual image, and the vertical decoder is trained to remove a longitudinal blur so as to output the second residual image.

5. The method of claim 3, wherein the first residual image and the second residual image are blurs estimated by the horizontal decoder and the vertical decoder, respectively, and horizontal and vertical motion components are included in the first residual image and the second residual image to decompose information inherent in the encoded features into information along an x-axis (horizontal axis) and a y-axis (vertical axis).

6. A single image deblurring network system via vertical and horizontal decomposition, the system comprising:
   an input unit configured to receive a single image;
   an encoder configured to extract a feature map from the received single image and reduce resolution of the feature map to generate features;

a horizontal decoder configured to decode the features provided from the encoder using a first convolution kernel to generate a first residual image;

a vertical decoder configured to decode the features provided from the encoder using a second convolution kernel generated by rotating the first convolution kernel to generate a second residual image; and a synthesis unit configured to synthesize the first residual image and the second residual image into the received single image to generate a deblurred image.

7. The system of claim 6, wherein the vertical decoder uses the second convolution kernel formed by rotating the first convolution kernel in a counterclockwise direction to generate the second residual image, and shares a deep learning parameter used by the horizontal decoder when generating the first residual image with the horizontal decoder.

* * * * *